(12) United States Patent
LeTourneau (10) Patent No.: US 7,630,995 B2
(45) Date of Patent: Dec. 8, 2009

(54) METHOD AND/OR SYSTEM FOR TRANSMITTING AND/OR RECEIVING DATA

(75) Inventor: Jack J. LeTourneau, Santa Barbara, CA (US)

(73) Assignee: Skyler Technology, Inc., Concord, CA (US)

( * ) Notice: Subject to any disclaimer, the term of this patent is extended or adjusted under 35 U.S.C. 154(b) by 618 days.

(21) Appl. No.: 11/006,842

(22) Filed: Dec. 7, 2004

(65) Prior Publication Data

US 2006/0123029 A1 Jun. 8, 2006

Related U.S. Application Data

(60) Provisional application No. 60/632,343, filed on Nov. 30, 2004.

(51) Int. Cl.
*G06F 17/30* (2006.01)
*G06F 7/00* (2006.01)

(52) U.S. Cl. ..................................... 707/101
(58) Field of Classification Search ............. 707/101
See application file for complete search history.

(56) References Cited

U.S. PATENT DOCUMENTS

| | | | |
|---|---|---|---|
| 4,156,910 A | 5/1979 | Barton et al. | |
| 4,745,561 A | 5/1988 | Hirosawa et al. | |
| 4,751,684 A | 6/1988 | Holt | |
| 4,905,138 A | 2/1990 | Bourne | |
| 4,931,928 A | 6/1990 | Greenfeld | |
| 4,989,132 A | 1/1991 | Mellender et al. | |
| 4,991,087 A | 2/1991 | Burkowski et al. | |
| 5,021,992 A | 6/1991 | Kondo | |
| 5,191,522 A | 3/1993 | Bosco et al. | |
| 5,235,701 A | 8/1993 | Ohler et al. | |
| 5,265,245 A | 11/1993 | Norstrom et al. | |
| 5,509,088 A | 4/1996 | Robson | |
| 5,598,350 A * | 1/1997 | Kawanishi et al. | ............ 702/20 |
| 5,606,669 A | 2/1997 | Bertin et al. | |
| 5,724,512 A | 3/1998 | Winterbottom | |
| 5,724,576 A | 3/1998 | Letourneau | |
| 5,758,152 A | 5/1998 | LeTourneau | |
| 5,781,906 A | 7/1998 | Aggarwal et al. | |
| 5,787,415 A | 7/1998 | Jacobson et al. | |
| 5,787,432 A | 7/1998 | LeTourneau | |
| 5,796,356 A | 8/1998 | Okada et al. | |
| 5,848,159 A * | 12/1998 | Collins et al. | ............ 380/30 |
| 5,978,790 A | 11/1999 | Buneman et al. | |
| 5,999,926 A | 12/1999 | Suciu | |
| 6,055,537 A * | 4/2000 | LeTourneau | ............ 707/101 |
| 6,141,655 A * | 10/2000 | Johnson et al. | ............ 707/2 |

(Continued)

OTHER PUBLICATIONS

"Core Technology Benchmarks A White Paper", Jul. 2002, downloaded from the internet Mar. 2, 2004.

(Continued)

*Primary Examiner*—Kuen S Lu
(74) *Attorney, Agent, or Firm*—Berkeley Law & Technology Group LLP (57) ABSTRACT

Embodiments of a method and/or system of transmitting and/or receiving data are disclosed. In certain embodiments, a sequence of binary values may represent a sequence of trees. Such a sequence may be transmitted as an electrical digital signal. In at least one particular implementation, such trees may be represented by natural numerals.

24 Claims, 8 Drawing Sheets

Rule A (Boolean)

$$410 \begin{cases} [0] \rightarrow \text{empty sequence} \\ [1] \rightarrow (\ ) \end{cases}$$

Rule B (Even)

$$420 \quad [2x] \rightarrow (\ ) [x]$$

Rule C (Add Non-composite)

$$430 \quad [Q(x)] \rightarrow ([x])$$

Rule D (Add Composite)

$$[x * y] \rightarrow [x] [y]$$

400

U.S. PATENT DOCUMENTS

| | | | |
|---|---|---|---|
| 6,199,103 B1 | 3/2001 | Sakuguchi | |
| 6,442,584 B1 | 8/2002 | Kolli et al. | |
| 6,714,939 B2 | 3/2004 | Saldanha et al. | |
| 6,785,673 B1* | 8/2004 | Fernandez et al. | 707/3 |
| 6,968,330 B2 | 11/2005 | Edwards et al. | |
| 7,051,033 B2 | 5/2006 | Agarwal et al. | |
| 7,191,182 B2 | 3/2007 | Anonsen et al. | |
| 7,203,774 B1 | 4/2007 | Zhou et al. | |
| 2002/0040292 A1 | 4/2002 | Marcu | |
| 2002/0129129 A1* | 9/2002 | Bloch et al. | 709/220 |
| 2002/0133497 A1 | 9/2002 | Draper et al. | |
| 2003/0041088 A1 | 2/2003 | Wilson et al. | |
| 2003/0065659 A1 | 4/2003 | Agarwal et al. | |
| 2003/0167445 A1 | 9/2003 | Su et al. | |
| 2003/0195885 A1* | 10/2003 | Emmick et al. | 707/8 |
| 2003/0195890 A1 | 10/2003 | Oommen | |
| 2003/0236794 A1 | 12/2003 | Hostetter et al. | |
| 2004/0010752 A1 | 1/2004 | Chan et al. | |
| 2004/0215642 A1 | 10/2004 | Cameron et al. | |
| 2004/0239674 A1 | 12/2004 | Ewald et al. | |
| 2004/0260683 A1 | 12/2004 | Chan et al. | |
| 2005/0060332 A1 | 3/2005 | Bernstein et al. | |
| 2005/0125432 A1 | 6/2005 | Lin et al. | |
| 2005/0187900 A1 | 8/2005 | LeTourneau | |
| 2005/0267908 A1 | 12/2005 | LeTourneau | |
| 2006/0004817 A1* | 1/2006 | Andrews | 707/101 |
| 2006/0015538 A1 | 1/2006 | LeTourneau | |
| 2006/0095442 A1 | 5/2006 | LeTourneau | |
| 2006/0095455 A1 | 5/2006 | LeTourneau | |
| 2006/0129582 A1 | 6/2006 | Schiffmann | |
| 2006/0259533 A1 | 11/2006 | LeTourneau | |
| 2006/0271573 A1 | 11/2006 | LeTourneau | |
| 2007/0198538 A1 | 8/2007 | Palacios | |

OTHER PUBLICATIONS

Hoffman et al., "Pattern Matching in Trees", Jan. 1982, ACM Press, vol. 29, Issue 1, pp. 68-95.

Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.

Letourneau, "The Elementary Theory of Object Oriented Arithmetic", pp. 1-9, Apr. 1990.

Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.

Sechrest et al., "Blending Hierarchical and Attribute-Based File Naming", Distributed Computing System, 1992., Proceedings of the 12$^{th}$ International Conference on Jun. 9-12, 1992, pp. 572-580.

Somani et al., "Phased-Mission System Analysis Using Boolean Algebraic Methods", May 1994, ACM Press, vol. 22, Issue 1.

Office action: Restriction Requirement in co-pending U.S. Appl. No. 11/005,859, dated Dec. 12, 2007.

Response to Restriction Requirement in co-pending U.S. Appl. No. 11/005,859, dated Jan. 14, 2008.

Non-Final OA in co-pending U.S. Appl. No. 11/005,859, dated Mar. 21, 2008.

Preliminary Amendment in co-pending U.S. Appl. No. 11/007,139, dated Apr. 28, 2005.

Non-Final OA issued in co-pending pending U.S. Appl. No. 11/007,139 dated May 14, 2007.

Response to Non-Final OA in co-pending U.S. Appl. No. 11/007,139 dated Oct. 15, 2007.

Supplemental Amendment in co-pending U.S. Appl. No. 11/007,139 dated Oct. 17, 2007.

Non-Final OA issued in co-pending U.S. Appl. No. 11/007,139 dated Jan. 2, 2008.

Response to Non-Final OA in co-pending U.S. Appl. No. 11/007,139 dated Apr. 8, 2008.

Office action: Restriction Requirement in co-pending U.S. Appl. No. 11/006,320 dated Mar. 26, 2007.

Response to Restriction Requirement in co-pending U.S. Appl. No. 11/006,320, dated Apr. 27, 2007.

Notice of Non-Compliant Amendment in co-pending U.S. Appl. No. 11/006,320, dated Jul. 6, 2007.

Response to Notice of Non-Compliant Amendment in co-pending U.S. Appl. No. 11/006,320, dated Jul. 25, 2007.

Non-Final OA issued in co-pending U.S. Appl. No. 11/006,320 dated Oct. 1, 2007.

Response to Non-Final OA in co-pending U.S. Appl. No. 11/006,320 dated Jan. 29, 2008.

Notice of Non-Compliant Amendment in co-pending U.S. Appl. No. 11/006,320 dated Apr. 8, 2008.

Non-Final OA issued in co-pending U.S. Appl. No. 11/006,848 dated Apr. 4, 2007.

Response to Non-Final OA in co-pending U.S. Appl. No. 11/006,848, dated Oct. 3, 2007.

Supplemental Amendment in co-pending U.S. Appl. No. 11/006,848, dated Nov. 13, 2007.

Non-Final OA issued in co-pending U.S. Appl. No. 11/006,848, dated Feb. 5, 2008.

Non-Final OA issued in co-pending U.S. Appl. No. 11/006,841, dated Apr. 6, 2007.

Response to Non-Final OA in co-pending U.S. Appl. No. 11/006,841, dated Sep. 6, 2007.

Office Action: Restriction Requirement in co-pending U.S. Appl. No. 11/006,841, dated Nov. 27, 2007.

Response to Restriction Requirement in co-pending U.S. Appl. No. 11/006,841, dated Dec. 27, 2007.

Office Action: Restriction Requirement in co-pending U.S. Appl. No. 11/006,841, dated Mar. 17, 2008.

Preliminary Amendment in co-pending U.S. Appl. No. 11/006,440 dated Apr. 28, 2005.

Preliminary Amendment and Substitute Specification in co-pending U.S. Appl. No. 11/006,440 dated Oct. 5, 2006.

Office Action: Restriction Requirement in co-pending U.S. Appl. No. 11/006,440 dated Mar. 29, 2007.

Response to Restriction Requirement in co-pending U.S. Appl. No. 11/006,440 dated May 1, 2007.

Non-Final OA issued in co-pending U.S. Appl. No. 11/006,440 dated Jun. 21, 2007.

Response to Non-Final OA in co-pending U.S. Appl. No. 11/006,440 dated Nov. 20, 2007.

Final OA issued in co-pending U.S. Appl. No. 11/006,440 dated Feb. 6, 2008.

Response to Final OA in co-pending U.S. Appl. No. 11/006,440 dated Apr. 7, 2008.

Preliminary Amendment in co-pending U.S. Appl. No. 11/006,446, dated Apr. 28, 2005.

Office Action: Restriction Requirement in co-pending U.S. Appl. No. 11/006,446, dated Apr. 4, 2007.

Response to Restriction Requirement in co-pending U.S. Appl. No. 11/006,446, dated May 3, 2007.

Non-Final OA issued in co-pending U.S. Appl. No. 11/006,446, dated Jul. 26, 2007.

Response to Non-Final OA in co-pending U.S. Appl. No. 11/006,446, dated Nov. 26, 2007.

Non-Final OA issued in co-pending U.S. Appl. No. 11/006,446, dated Feb. 20, 2008.

Office Action: Restriction Requirement in co-pending U.S. Appl. No. 11/412,417, dated Apr. 1, 2008.

Co-pending U.S. Appl. No. 11/319,758, filed Dec. 2005.

Co-pending U.S. Appl. No. 11/320,538, filed Dec. 2005.

Co-pending U.S. Appl. No. 11/480,094, filed Jun. 2006.

Response to Notice of Non-Compliant Amendment in co-pending U.S. Appl. No. 11/006,320 dated May 5, 2008.

Advisory Action issued in co-pending U.S. Appl. No. 11/006,440 dated May 9, 2008.

Non-Final OA issued in co-pending U.S. Appl. No. 11/385,257, dated Apr. 29, 2008.

Preliminary Amendment in co-pending U.S. Appl. No. 11/005,859, dated May 2, 2005.

Preliminary Amendment in co-pending U.S. Appl. No. 11/006,320 dated May 9, 2005.

Preliminary Amendment in co-pending U.S. Appl. No. 11/006,848, dated May 3, 2005.

Iacob et al., "XPath Extension for Querying Concurrent XML Markup", Technical Report #TR 394-04, Department of Computer Science, University of Kentucky, Lexington, KY 40506, Mar. 6, 2004, 15 pages.

Leinonen et al., "Automation of Document Structure Transformation", Auditorium, Microteknia Building, University of Kuopio, Nov. 5, 2004, 68 pages.

Lerman et al., "Learning the Common Structure of Data", American Association for Artificial Intelligence, AAAI-00 Proceedings, www.aaai.org, 2000, 6 pages.

Wu et al., "A Prime Number Labeling Scheme for Dynamic Ordered XML Trees", IEEE, 2004, 13 pages.

Final Office action mailed Jul. 8, 2009 in co-pending U.S. Appl. No. 11/005,859, 8 pages.

Final Office action mailed Aug. 4, 2009 in co-pending U.S. Appl. No. 11/007,139, 18 pages.

Final Office action mailed Jul. 29, 2009 in co-pending U.S. Appl. No. 11/006,320, 7 pages.

Issue Fee filed Sep. 11, 2009 in co-pending U.S. Appl. No. 11/006,848, 10 pages.

Notice of Allowance mailed Jun. 29, 2009 in co-pending U.S. Appl. No. 11/006,841, 40 pages.

Issue Fee filed Sep. 29, 2009 in co-pending U.S. Appl. No. 11/006,841, 4 pages.

Supplemental Amendment filed Jul. 17, 2009 in co-pending U.S. Appl. No. 11/006,440, 29 pages.

Notice of Allowance mailed Jul. 31, 2009 in co-pending U.S. Appl. No. 11/006,440, 15 pages.

Office action mailed Jul. 7, 2009 in co-pending U.S. Appl. No. 11/006,446, 32 pages.

Examiner's Amendment and Reasons for Allowance mailed Sep. 3, 2009 in co-pending U.S. Appl. No. 11/006,440, 9 pages.

Response filed Jun. 30, 2009 in co-pending U.S. Appl. No. 11/385,257, 31 pages.

Office action mailed Sep. 14, 2009 in co-pending U.S. Appl. No. 11/385,257, 37 pages.

Final Office action mailed Aug. 3, 2009 in co-pending U.S. Appl. No. 11/319,758, 35 pages.

Response filed Jul. 1, 2009 in co-pending U.S. Appl. No. 11/320,538, 26 pages.

Response filed Aug. 27, 2009 in co-pending U.S. Appl. No. 11/361,500, 36 pages.

Office action mailed Jun. 30, 2009 in co-pending U.S. Appl. No. 11/412,417, 34 pages.

Final Office action mailed Jul. 28, 2009 in co-pending U.S. Appl. No. 11/480,094, 12 pages.

* cited by examiner

| NATURAL NUMERALS | BELT: |
|---|---|
| 0 |  |
| 1 |  |
| 2 |  |
| 3 |  |
| 4 |  |
| 5 |  |
| 6 |  |

Rule A (Boolean)

410 $\begin{cases} [0] \rightarrow \text{ empty sequence} \\ [1] \rightarrow (\ ) \end{cases}$ Rule B (Even)

420 $[2x] \rightarrow (\ )\ [x]$

Rule C (Add Non-composite)

430 $[Q(x)] \rightarrow (\ [x]\ )$

Rule D (Add Composite)

$[x * y] \rightarrow [x]\ [y]$

$Q(0) \Rightarrow 2$ $Q(1) \Rightarrow 3$ $Q(2) \Rightarrow 5$ $Q(3) \Rightarrow 7$ $Q(4) \Rightarrow 11$ $Q(5) \Rightarrow 13$ $Q(6) \Rightarrow 17$ $Q(7) \Rightarrow 19$ $Q(8) \Rightarrow 23$ $Q(9) \Rightarrow 29$ $Q(10) \Rightarrow 31$

$Q(11) \Rightarrow 37$ $Q(12) \Rightarrow 41$

A. If grouping or subgrouping S is empty sequence then Eval (S)=0; if S is ( ) then Eval (S) = 1

B. If grouping or subgrouping S is ( )T then Eval (S) = Eval ( ( )T) = 2 * Eval (T)

C. If grouping or subgrouping S is (T) then Eval (S) =Eval ((T)) = Q (Eval(T))

D. If grouping or subgroping S is UV then Eval (S) = Eval (UV) = Eval (U) * Eval (V)

METHOD AND/OR SYSTEM FOR TRANSMITTING AND/OR RECEIVING DATA

This disclosure claims priority pursuant to 35 USC § 119 (e) from U.S. Provisional Pat. App. Ser. No. 60/632,343, filed on Nov. 30, 2004, By J. J. LeTourneau, titled "METHOD AND/OR SYSTEM FOR TRANSMITTING AND/OR RECEIVING DATA," assigned to assignee of claimed subject matter.

BACKGROUND

This disclosure is related to transmitting data and/or receiving data.

A variety of techniques exist for transmitting and/or receiving data. However, such techniques typically have several disadvantages, including, a limit on the size of the datum that may be transmitted and/or received, such as 32 or 64 bits, for example. Another disadvantage includes the difficulty of synchronization between a receiver and transmitter. Thus, new methods and/or systems for receiving and/or transmitting data continue to be desirable.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of fields, it is convenient and/or desirable to represent data, a set of data and/or other information in a hierarchical fashion. In this context, such a hierarchy of data shall be referred to as a "tree." In a particular embodiment, a tree may comprise a finite, rooted, connected, acyclic graph. Likewise, such trees may be either ordered or unordered. Here, ordered refers to the notion that there is an ordering or precedence among nodes attached to a common node corresponding to the order of the attached nodes shown in a graphical illustration. An unordered tree is illustrated here, for example, in FIG. 1 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop.

Figure 1:
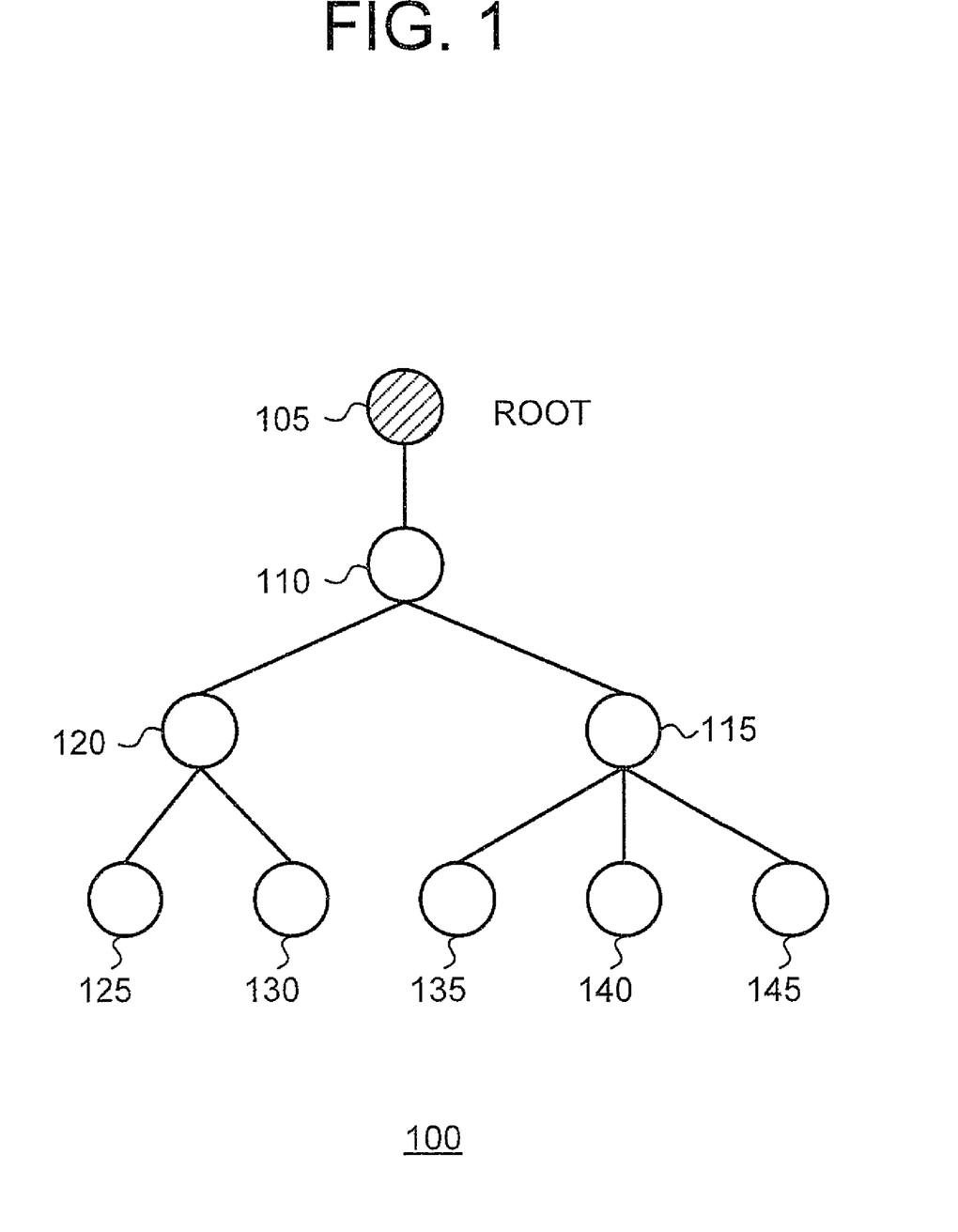
FIG. 1 is a schematic diagram of an embodiment of a tree.

In a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data and/or values may be limited to a particular set of data. For example, in this context, a binary edge labeled tree refers to a tree in which the data and/or values comprise binary data, that is, in this example, either a binary one or a binary zero. Likewise, alternatively, the edges of a tree may be labeled with one value, or three values. Continuing, the edges may be labeled with four values, five values, etc. In this context, the class of all trees in which the edges are labeled with a specific number of distinct values, that is, in this context, values chosen from a set having a specific number of distinct elements, shall be referred to as edge-labeled trees (ELTs). It is likewise noted that such trees are not limited to being labeled with numerals, such as binary numerals as previously described. Any distinctly identifiable labels may be employed; however, in this context, it shall be understood that employing numerals to label the edges is sufficiently general to encompass any sort of data labels that may be desirable, regardless of their form. For example, and without loss of generality, a table look-up process may be employed to convert between a set of data or other labels and a set of natural numerals.

To reiterate, in this context, a tree comprises an edge labeled tree if each edge of the string or tree respectively stores a value or single piece of data. Likewise, in this context, two nodes are employed to support an edge holding a single piece of data. At this point, it is worth noting that trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

It is noted that binary edge labeled trees (BELTS) may be listed or enumerated. See, for example, U.S. provisional patent application Ser. No. 60/543,371, titled "Manipulating Sets of Hierarchical Data," filed on Feb. 9, 2004, by J. J. LeTourneau, and assigned to the assignee of the current provisional application. This is illustrated, here, for example, in FIG. 2. It is noted that this particular figure also includes the associated natural numerals. The association of such numerals for this particular embodiment should be clear based at least in part on previously cited U.S. provisional patent application Ser. No. 60/543,371. However, it is, of course, again noted that the claimed subject matter is not limited in scope to employing the approach or approaches described in aforementioned U.S. provisional patent application Ser. No. 60/543,371. U.S. provisional patent application Ser. No. 60/543,371 is provided simply as an example of listing or enumerating unordered BELTs.

Figure 2:
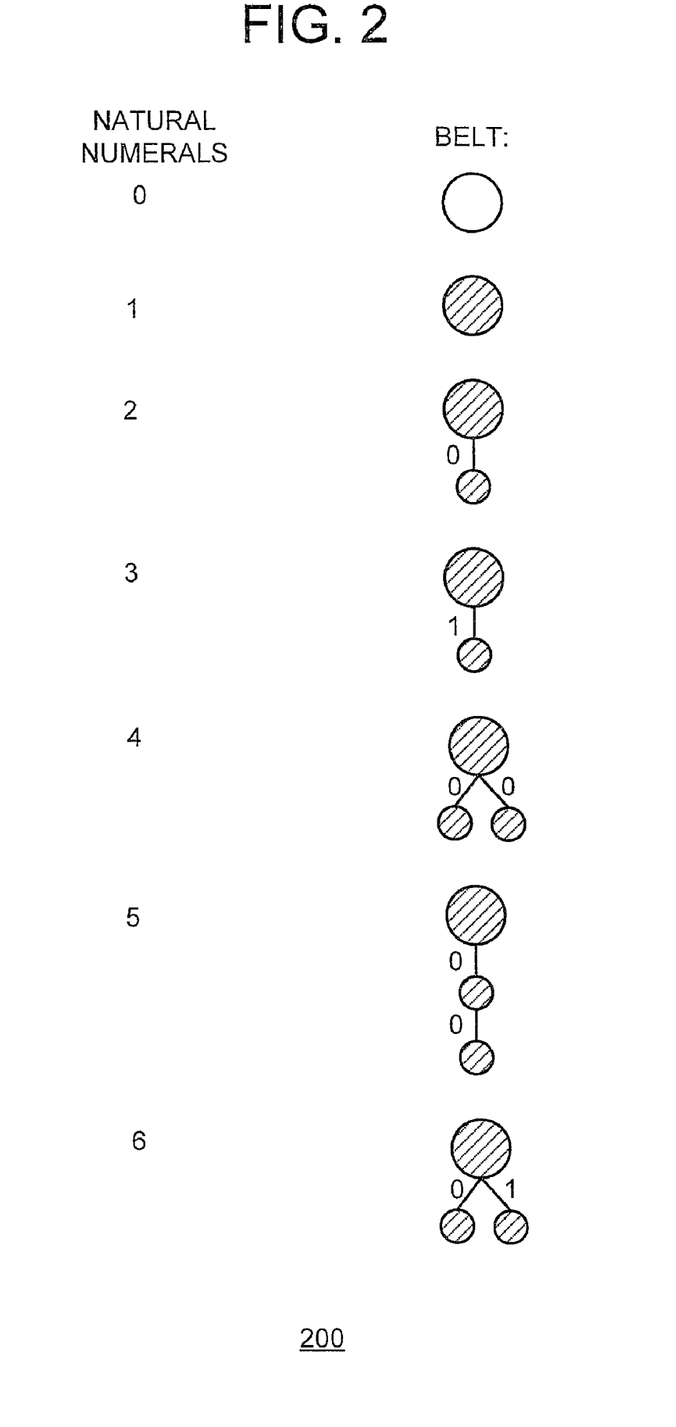
FIG. 2 is a schematic diagram illustrating an embodiment of an association between natural numerals and binary edge labeled trees.

However, for this particular embodiment, although the claimed subject matter is not limited in scope in this respect, a method of enumerating a set of unordered trees may begin with enumeration of an empty binary edge labeled tree and a one node binary edge labeled tree. Thus, the empty tree is associated with the natural numeral zero and has a symbolic representation as illustrated in FIG. 2 (circle). Likewise, the one node tree, which holds no data, is associated with the natural numeral one and has a graphical representation of a single node. For higher positive natural numbers, ordered trees may be generated by a process described, for example, in "The Lexicographic Generation of Ordered Trees," by S. Zaks, The Journal of Theoretical Computer Science, Vol. 10(1), pp63-82, 1980, or, "Enumerating Ordered Trees Lexicographically," by M. C. Er, Computation Journal, Vol. 28, Issue 5, pp 538-542, 1985. This may be illustrated, for example in FIG. 2, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Thus, referring again to FIG. 2, the one-push of the root tree is the tree at position three. This follows from FIG. 9 of previously referenced U.S. provisional patent application Ser. No. 60/543,371, since $Q((1*2)-1)=Q(1)=3$. Likewise, the tree at position five is the zero-push of the tree at position 2. Again, this follows from FIG. 9 of the previously referenced U.S. provisional patent application, since $Q((2*2)-2)=Q(2)=5$.

In the embodiment just described, binary edge labeled trees use binary numerals "0" and "1." However, as previously suggested, the claimed subject matter is not limited in scope to binary edge labled trees. For example, trees may employ any finite number of numeral combinations as labels, such as a unitary value, triplets, quadruplets, etc. Thus, using a quadruplet example, it is possible to construct trees, such as a zero-push of a particular tree, a one-push of that tree, a two-push of that tree, and a three-push of that tree. Thus, for such trees, edges may be labeled 0, 1, 2 or 3, etc., for example.

The foregoing discussion has begun to characterize an algebra involving trees, in this particular embodiment, an algebra for unordered edge labeled trees or unordered ELTs, such as BELTs. The foregoing discussion defines a value zero, a zero node tree for this particular embodiment, a value one, a one node tree for this particular embodiment, and monadic operations, previously described as a zero-push and a one-push. For this particular embodiment, an additional operation may be characterized, a "merger" operation. The merger operation with respect to trees refers to merging two trees at their roots. This operation is illustrated, for example, in FIG. 3.

Figure 3:
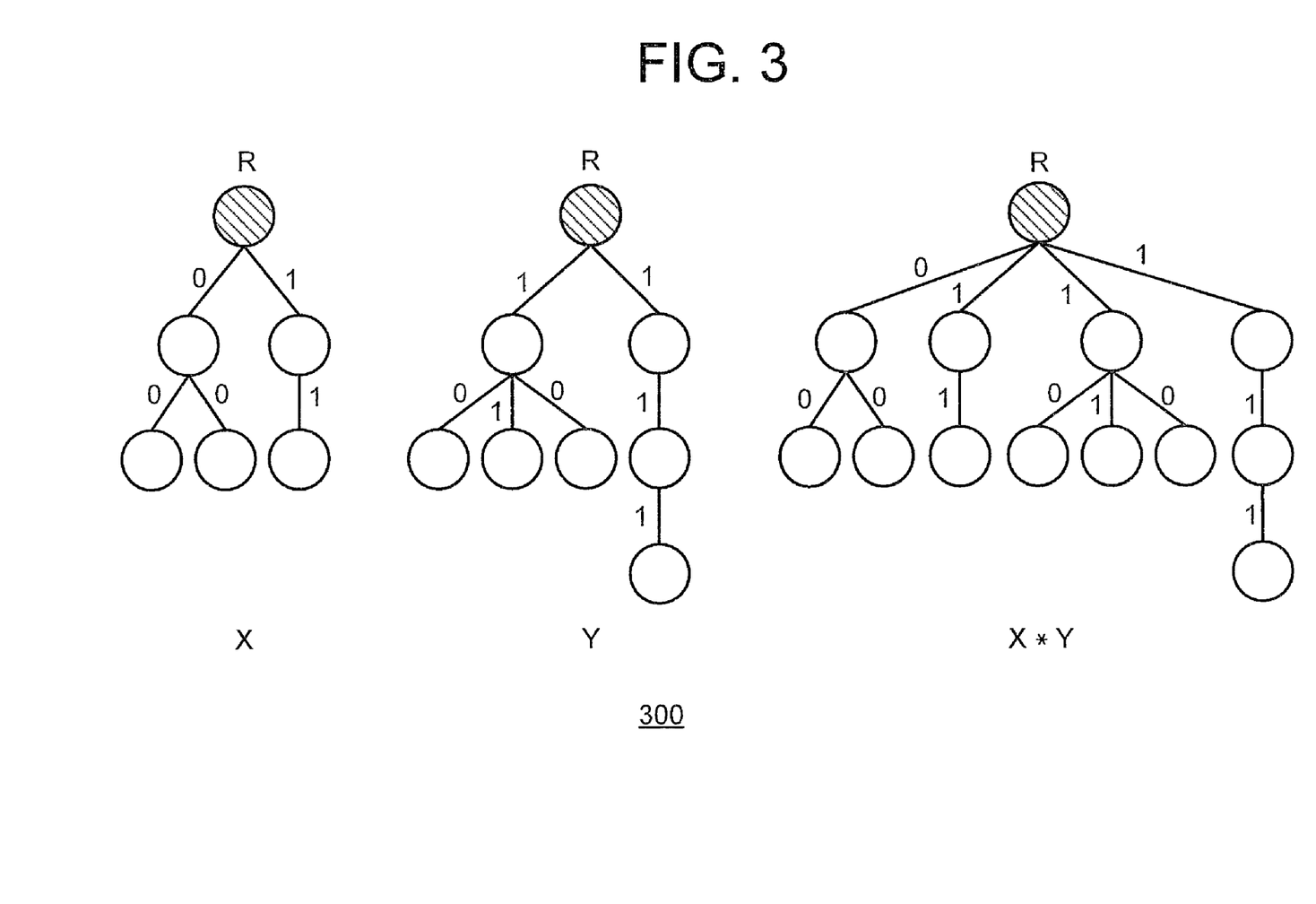
FIG. 3 is a schematic diagram illustrating an embodiment of an operation applied to an embodiment of two binary edge labeled trees.

As will now be appreciated, the merger operation comprises a binary operator. Likewise, the constants zero/one, referred to above, may be viewed as an operation having no argument or as a zero valued argument operator or operation. Thus, this operation, in effect, returns the same value whenever applied. Here, for this particular embodiment, the constant value, or zero valued argument operation returns "c" and is denoted as "c." The merger operator is denoted as "*" and here comprises a binary operation. In contrast, in U.S. provisional patent application No. 60/575,784, titled "Method and/or System for Simplifying Tree Expressions, such as for Pattern Matching," filed May 28, 2004, by J. J. LeTourneau, assigned to the assignee of the current application, monadic operators were employed, referred to as successor operators, using the symbol S(x), much like the push operations previously described.

Previously, an embodiment for manipulating binary edge labeled trees or BELTs was described in connection with U.S. provisional patent application 60/543,371. In that context, binary edge labeled trees comprise finite rooted, unordered two valued edge labeled trees. Thus, for the particular embodiment of binary edge labeled trees described, the two values comprise "0" and "1," although alternately they could comprise A and B, for example, or any other two values. Likewise, previously, in U.S. provisional application 60/543, 371, an embodiment was demonstrated in which an association existed between natural numerals and binary edge labeled trees. For this particular embodiment, similar associations also exist, here between any N valued edge labeled tree and the natural numerals, where N is a numeral. Of course, many different associations are possible and the claimed subject matter is intended to cover all such associations regardless of the particular embodiment. Thus, for example, three valued edge label trees may be converted to numerals, four valued edge labeled trees may be converted to numerals and so forth. Thus, manipulations, such as those previously described, for example, in aforementioned provisional U.S. patent application 60/543,371, as well as additional manipulations, may be applied to N valued edge labeled trees, as described in more detail hereinafter. See, for example, U.S. provisional patent application Ser. No. 60/623, 280, titled "METHOD AND/OR SYSTEM FOR MANIPULATING TREE EXPRESSIONS" filed on Oct. 29, 2004, by J. J. LeTourneau, and U.S. provisional patent application Ser. No. 60/623,352 titled "METHOD AND/OR SYSTEM FOR TAGGING TREES" filed on Oct. 29, 2004, by J. J. LeTourneau; both of the foregoing assigned to the assignee of the current provisional patent application.

Figure 6:
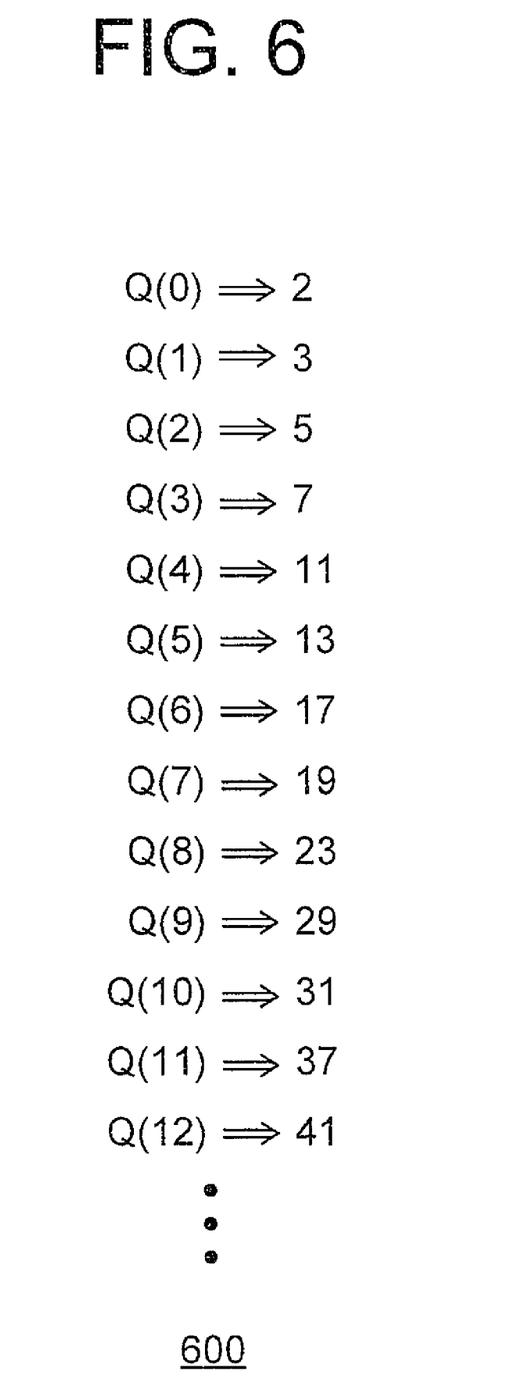
FIG. 6 is a table illustrating an embodiment of an operation that associates non-composite natural numerals with natural numerals.

As suggested in previously referenced U.S. provisional application 60/543,371, in one particular embodiment, when converting between binary edge labeled trees and numerals, a relationship was found to exist between a "push" operation and non-composite numerals. Thus, in this context, it may be convenient to define an operation indexed by the natural numerals that provides in ascending order the non-composite numerals, although, of course, the claimed subject matter is not limited in scope in this respect. Such an operation is depicted specifically in FIG. 6. As described in more detail hereinafter, this operation is also convenient in this context in connection with unitary edge labeled trees.

As previously suggested in aforementioned U.S. provisional patent application No. 60/575,784, a set of congruence operations on a set of tree expressions may be isomorphic to a set of finite, rooted, unordered binary edge labeled trees. Thus, or more particularly, under such an isomorphism, in the particular embodiment, a one-to-one relationship between the equivalence classes that satisfy the tree expressions and the finite, rooted, ordered binary edge labeled trees may exist.

It is likewise noted that, for this particular embodiment, one way of manipulating an edge labeled tree is to apply a push operation to the edge labeled tree. Likewise, as previously described, for this embodiment, a push operation comprises adding an edge and labeling it. For this embodiment, the labels for the edge labeled tree comprise numerals. Of course, this is merely one potential embodiment and the claimed subject matter is not limited in scope in this respect. For example, as previously described, letters may be employed. Likewise, any set of values where each value is distinct may be employed and remain within the scope of the claimed subject matter. Furthermore, a similar set of manipulations may be applied to node labeled trees rather than edge labeled trees. Likewise, a push operation may be applied to a node labeled tree, as previously described for edge labeled trees.

Figure 4:
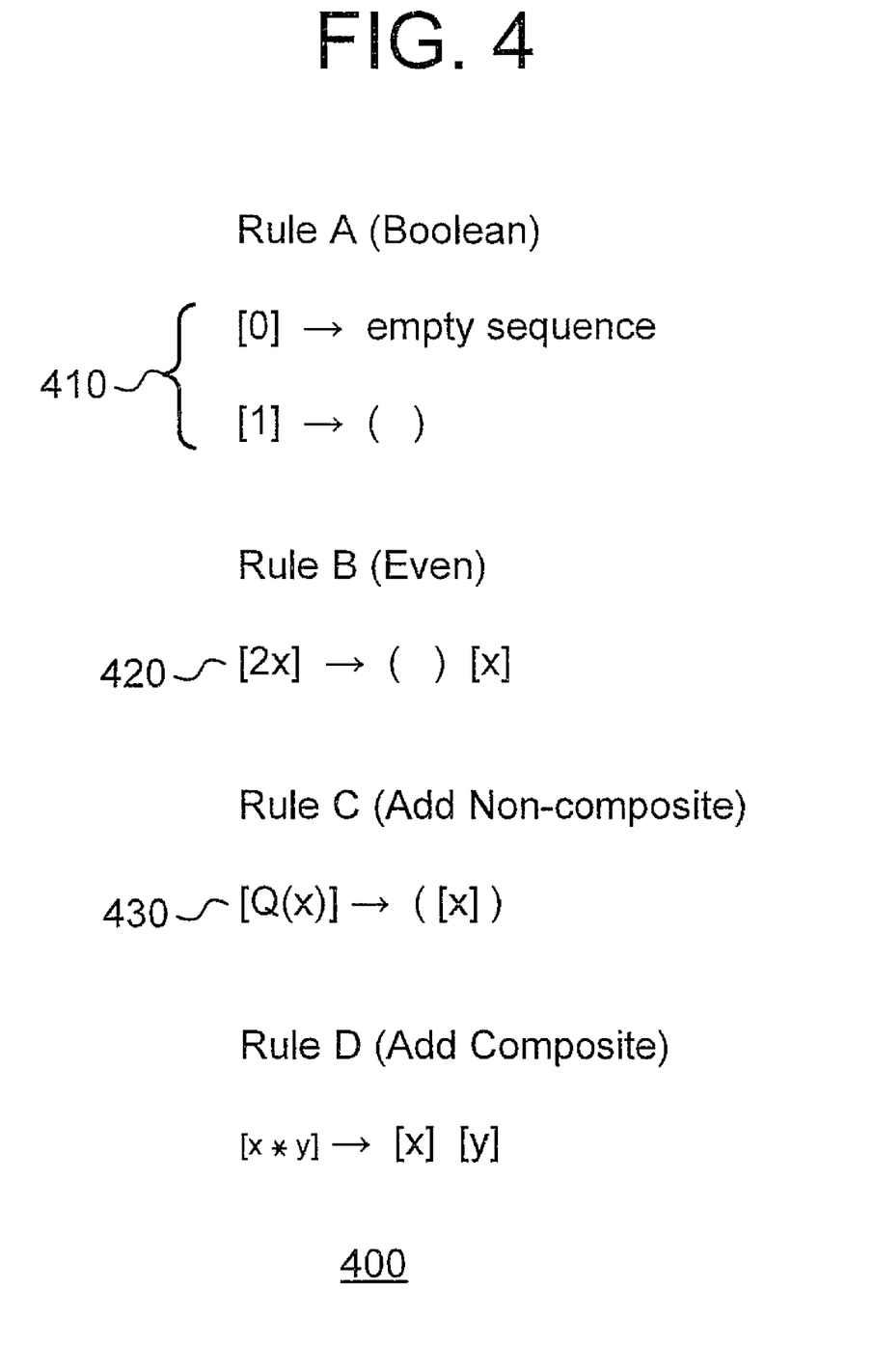
FIG. 4 is a table illustrating an embodiment of operations in which natural numerals are associated with an embodiment of a sequence of binary values.
Figure 5:
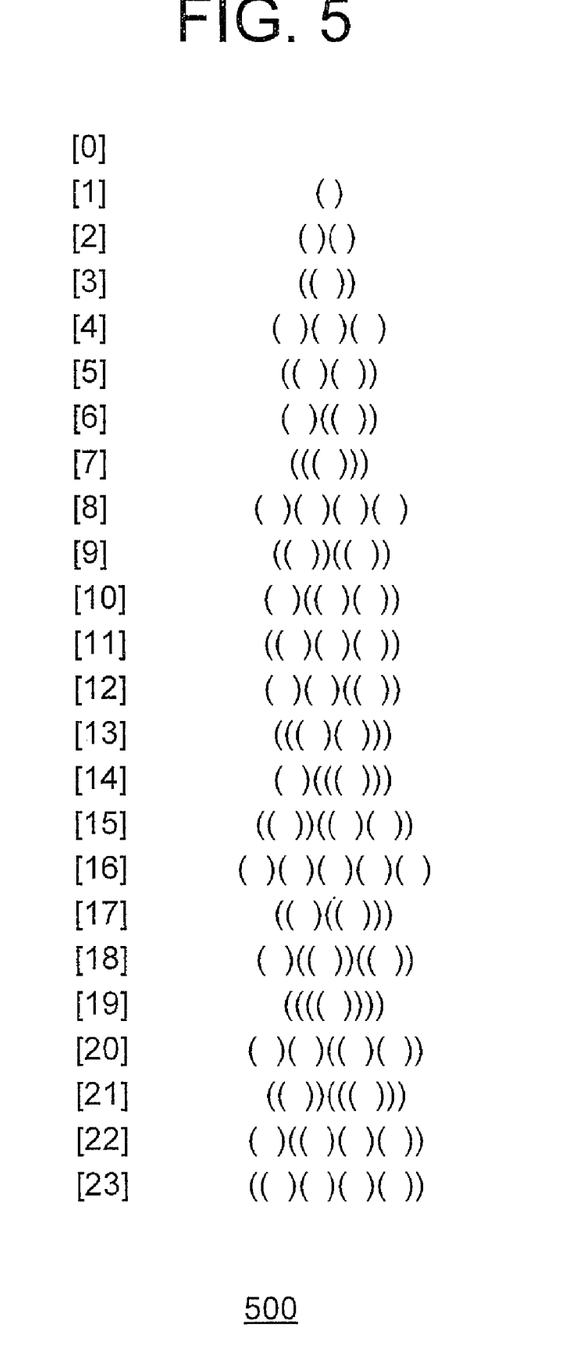
FIG. 5 is a table illustrating an application of the embodiment of FIG. 4 to a series of natural numerals.

Additional uses of the previously described embodiment also exist, although the claimed subject matter is not limited in scope to a particular embodiment. For example, in one embodiment, FIG. 5 provides an embodiment of an association between natural numerals, on the left-hand side of FIG. 5, and a set of binary-valued strings or binary sequences, on the right-hand side of FIG. 5. Of course, as has been previously indicated, the claimed subject matter is not limited in scope to this particular association embodiment and many other association embodiments are included within the scope of the claimed subject matter. Nonetheless, there are aspects of this particular embodiment worthy of further discussion. For example, FIG. 4 provides a set of rules that permit conversion between the natural numerals and this particular association embodiment of sequences. Again, it is noted that the claimed subject matter is not limited in scope to this particular embodiment. However, as shall be discussed in more detail hereinafter, a feature of this particular embodiment is the ability to represent push operations and merger operations, such as those previously described in connection with edge labeled trees, using strings or sequences, here binary-valued strings or sequences.

FIG. 4 provides for this embodiment a set of rules for converting natural numerals to binary-valued strings. In this context, for FIGS. 4 and 5, a numeral with brackets, such as [X], is intended here to denote the binary sequence for X. As illustrated, and as is similar to the approach previously employed in conjunction with edge labeled trees, the numeral 0 is assigned an empty string, whereas the numeral 1 is assigned a pair of corresponding left-right brackets or parentheses (It is noted that the terms brackets and parentheses used interchangeably). This is indicated by expression 410. It is likewise noted that, in this context, the numeral zero is included when referring to the natural numerals. Likewise, as is illustrated by expression 420 in FIG. 4, a non-zero numeral that is two times the numeral X is represented as the string or sequence for X plus an extra set of left-right brackets or parentheses in front of the string or sequence for the numeral X. Likewise, expression 430, denoted the odd non-composite rule, is similar in concept to a push operation, previously described in connection with edge labeled trees. If a natural numeral is a non-composite numeral, it is assigned the string or sequence for the natural number index of that non-composite, as defined by the operation shown in FIG. 6, but then surrounded by an additional left-hand bracket on the left-hand side and an additional right hand bracket on the right-hand side, as depicted in FIG. 4. Further, expression 440 comprises the merger rule in which the multiplication of two natural numerals is simply the combination of the strings or sequences for those natural numerals represented side by side or adjacent to one another. It is further noted, although the claimed subject matter is not limited in scope in this respect, that a convention may be introduced to ensure that a unique association exists between particular numerals and strings. For example, one such convention may be that the smaller of the two numerals is the string or sequence on the left, for example, although, the claimed subject matter is not limited in scope to such a particular approach. From these rules, it is possible to construct the binary-valued sequences shown in FIG. 5 that correspond with the natural numerals. Again, it is noted that this is a particular association embodiment and the claimed subject matter is not limited in scope in this respect. Thus any one of a number of other rules for constructing sequences might have been employed and remain within the scope of the claimed subject matter.

A feature of this embodiment, although the claimed subject matter is not limited in scope in this respect, is that the binary-valued sequences shown in FIG. 5 may likewise be associated with unitary edge labeled trees, that is, trees that employ a single unitary label for all of the edges of the tree. To be more specific, the set of distinct values from which labels for edges are chosen is a set of one value only in such an embodiment. Alternatively, such trees need not have their edges labeled with any value since in such an embodiment the value is the same for all edges. Here, such an edge labeled tree may be converted to, for example, for this particular embodiment, a binary-valued string corresponding the edge labeled tree and the string may be manipulated in place of manipulating a corresponding natural numeral.

Thus, this particular embodiment provides an approach in which unitary edge labeled trees may be manipulated by converting to natural numerals, manipulating the natural numerals, and converting back to unitary edge labeled trees. See, for example, U.S. provisional patent application Ser. No. 60/623,280 titled "METHOD AND/OR SYSTEM FOR MANIPULATING TREE EXPRESSIONS filed on Oct. 29, 2004, by J. J. LeTourneau, and U.S. provisional patent application Ser. No. 60/623,352, titled "METHOD AND/OR SYSTEM FOR TAGGING TREES filed on Oct. 29, 2004, by J. J. LeTourneau; both of the foregoing assigned to the assignee of the current provisional patent application. Furthermore, unitary edge labeled trees may be manipulated by converting to corresponding binary-valued strings, manipulating the strings, and then converting back to unitary edge labeled trees. It is noted that the claimed subject matter is not limited to these particular approaches or to employing any one of these approaches alone. The desirability of the approach will vary with a variety of potential factors, including storage capabilities, processing capabilities, the particular application and the like.

In yet another embodiment in accordance with the claimed subject matter, a sequence of natural numerals may be converted to a binary sequence representing trees of finite size, such as unitary trees. As shall be discussed in more detail hereinafter, additionally padding values may be imbedded or added between the portion of the sequence that represents natural numerals, also referred to as data or signal information in this particular context. The resulting sequence may then be transmitted. Likewise, the binary sequence representing natural numerals in the form of finite trees plus padding values may be received and then converted into the sequence of natural numerals at the receiving end.

Thus, although the claimed subject matter is not limited in scope in this respect, this particular embodiment provides a technique for transmitting a finite sequence of natural numerals by employing two values, referred to in this context as a binary sequence or a binary-valued string. It is noted that these values may comprise "0" and "1" as is conventionally employed in connection with digital systems, although, of course, the claimed subject matter is not limited in scope in this respect. Instead, for this particular embodiment, and as illustrated in connection with FIG. 4, "0" shall comprise a left parenthesis, denoted "(", and "1" shall comprise a right parenthesis, denoted ")", for this particular embodiment. Nonetheless, as is understood, there is no loss of generality by employing this value replacement for the purposes of this particular embodiment.

Figure 7:
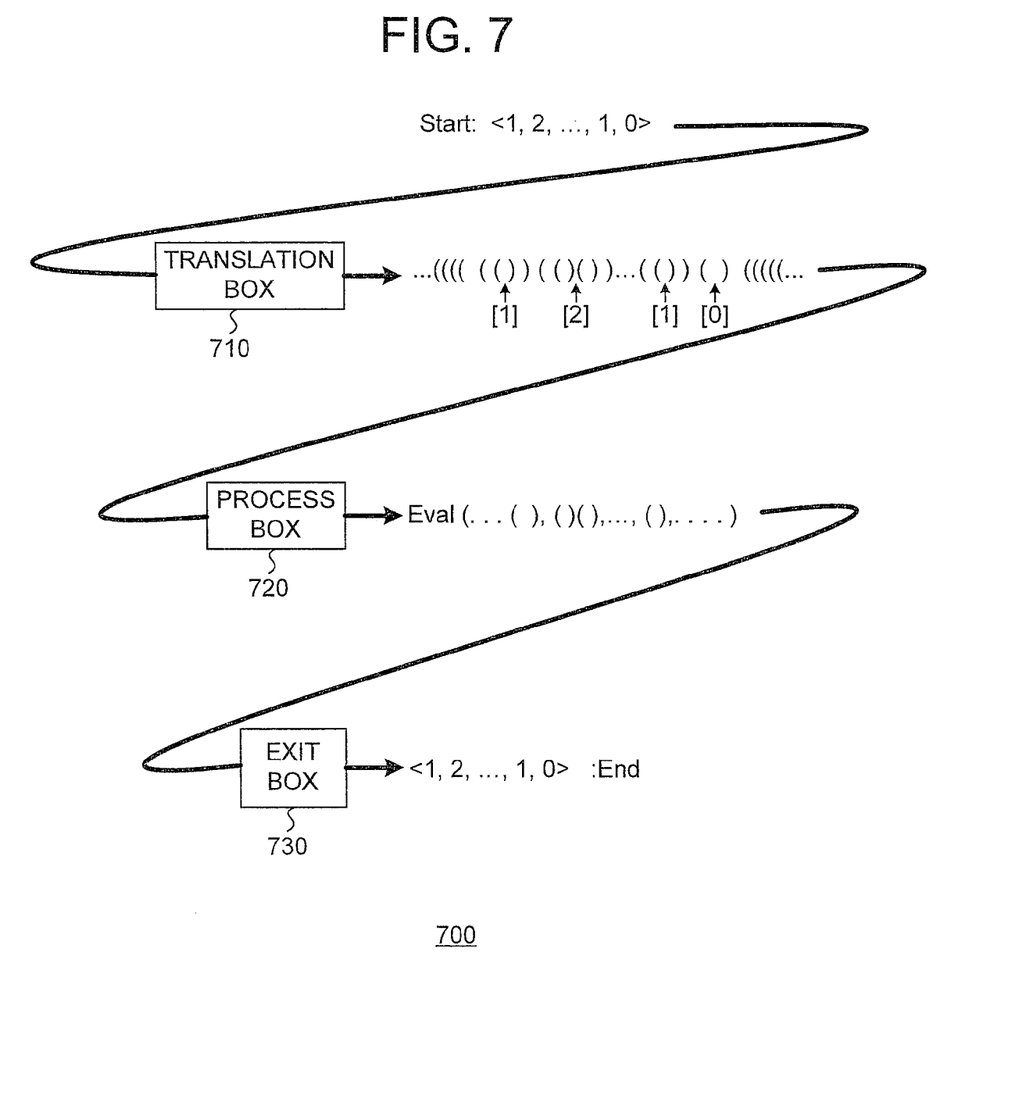
FIG. 7 is a schematic diagram illustrating an embodiment of a technique for transmitting natural numerals using binary sequences.

FIG. 7 is a schematic diagram illustrating an example of this particular embodiment. Thus, as illustrated, a finite sequence of natural numerals, designated for example as 1, 2, . . . , 1, 0 are translated, depicted here by box 710 in FIG. 7. This translation may be implemented using a table look up, for example, applying the approach previously described with respect FIGS. 4 and 5. Alternatively, of course, instead, the previously described approach may be implemented by a computing platform programmed to determine the desired binary sequence representation for a natural numeral, computed, for example, as previously described, from a finite tree, such as a unitary tree for this particular embodiment.

Although the claimed subject matter is not limited in scope in this respect, as suggested, one technique for implementing this approach may be to apply a table look up approach. Techniques for performing table look-ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data, such as a tree as previously described, for example, may be formed. Likewise, operations and/or manipulations, as described, may be performed; however, operations and/or manipulations in addition to those described or instead of those described may also be applied. It is intended that the claimed subject matter cover all such embodiments.

Additionally, padding values may be imbedded or inserted between representations of the particular natural numerals, here, the particular binary representations for the particular trees. In this particular embodiment, such a padding value comprises a left parenthesis, although, of course, the claimed subject matter is not limited in scope in this respect. It is noted that, for this embodiment, an arbitrary amount of padding may be inserted between the representations of the natural numerals to be transmitted. As discussed in more detail, this is one desirable aspect of this particular embodiment. Although the claimed subject matter is not limited in scope in this respect, such padding may be inserted between such representations, as depicted by process box 720 in FIG. 7. It is this combined binary sequence that then may be transmitted across a transmission media or communications channel. This binary sequence may then be received at a receiver which may then be employed, as depicted by box 730, to convert the binary sequence back into the natural numerals, as described in more detail below, for this particular embodiment.

It is noted that this particular embodiment has a number of desirable properties associated with it. For example, natural numerals may be transmitted in any multiplicity and in any order. Likewise, although the previous discussion suggests the communication of natural numerals, in an alternate embodiment, a table look up may be employed at each end of a communications channel to permit communication of other information other than natural numerals. For example, natural numerals may represent other information to be communicated and a table look up process at the receiving end and transmitting end may be employed to perform the conversion prior to transmission and after reception. Likewise, in FIG. 7, the particular binary sequence is illustrated as being applied to process box 720 in reverse order, so that the sequence is "read" right to left here, although this is merely one embodiment and, alternatively, the binary sequence may be applied to process box 720 without employing this reverse order.

As previously indicated, in this particular embodiment, right parenthesis or right bracket and left parenthesis or left bracket in place of the conventional binary values "0" and "1"; however, the claimed subject matter is not limited in this respect. Likewise, for the embodiment illustrated in FIG. 7, as illustrated and discussed in more detail later, a sequence of values is read right to left, although, of course, the claimed subject matter is not limited in scope in this respect. Thus, on the receiver side of the communications channel, if a right parenthesis is received, this indicates the start of a sequence of data or signal information. Alternatively, if a left parenthesis is received this indicates padding unless a right parenthesis is received first that corresponds to the left parenthesis. One way to implement this, although, of course, the claimed subject matter is not limited in scope in this respect, is by assigning a minus one (−1) to a left parenthesis or bracket and a plus one (+1) to a right parenthesis or bracket. Thus, by accumulating values as parentheses are received, encountering zero may be employed to indicate or synchronize the beginning of a binary sequence of data. This approach has a number of potential advantages, although the claimed subject matter is not limited in scope to this approach or to possessing the particular advantages of a particular embodiment.

An effect of this accumulation approach is to match binary values in this particular embodiment, such as matching a left parenthesis with a corresponding right parenthesis. Once the accumulation equals zero, the receiver recognizes that it has received signal information, in this particular embodiment, a binary sequence representing a natural numeral. In this context, the term signal information generally refers to data to be transmitted across a communications channel. Thus, a first right parenthesis is a wake up signal to the receiver and a corresponding left parenthesis signals the end of a grouping of signal information. Likewise, if zero is reached again, this allows the receiver to recognize that signal information has been communicated. Otherwise, what is received represents padding values that may be inserted between groupings of signal information. Of course, for this embodiment, the particular groupings represent particular natural numerals. Likewise, with this mechanism, referring to FIG. 5, if nothing, that is, no additional values, is received between corresponding binary values, such as left and right parenthesis, this signifies the natural numeral zero in this embodiment using the empty sequence of empty string. Alternately, the natural numeral one and the remaining natural numerals may be indicated by receiving a sequence of binary values or right and left parentheses, such as those indicated in FIG. 5, between a first set of corresponding binary values, such as between a right and a left parenthesis, although the claimed subject matter is not limited in scope in this respect. As the previous discussion in FIG. 5 indicates, a particular grouping of signal information will not be completely received until the accumulation at the receiver equals zero. This is a signal in this embodiment to the receiver that a grouping of binary values that represents a discrete natural numeral has been received between a set of corresponding binary values, such as, for this embodiment, a right parenthesis and a left parenthesis.

One technique, although the claimed subject matter is not limited in scope in this respect, to determine whether a portion of a binary sequence is padding or signal information is based at least in part on the amount that has been accumulated at the time a particular binary value is received. For example, using the convention previously described, if the accumulation is negative, that indicates data or signal information is currently being received; however, if the accumulation is positive, that indicates padding, such as, for one embodiment, for example, control signal information, is currently being received.

This particular technique or embodiment has a number of useful properties, although the claimed subject matter is not limited in scope to this particular embodiment. For example, a natural numeral of any particular size may be transmitted across a communications channel. Thus, communication of a natural numeral is not limited by a buffer size or register size, such as 32 bits or 64 bits. Likewise, similarly, arbitrarily-sized padding or breaks may be employed between natural numerals. In addition, as the previous discussion illustrates, for this particular embodiment, the binary sequence is self-synchronizing. More specifically, the receiver becomes synchronized whenever zero is reached during accumulation, as previously described. This provides an advantage over other types of approaches in which synchronizing signals are transmitted separately from the data.

It is likewise noted that the ability to provide arbitrary padding or breaks between signal information provides a number of different potential capabilities, although the following examples are not intended to limit the scope of the claimed subject matter in any way. For example, it may be possible to use padding between groupings of binary values to communicate control signals, such as, in one example, potential multiplexing of the sequence signal information. In this particular context, the term control signals or control signal information refers to signal information that is not data to be communicated, For example, the padding could designate different processors or other hardware that are to receive and/or process a particular portion of the binary sequences received. Likewise, if several independent binary sequences are transmitted separately, the self-synchronizing capability previously described provides the capability for the independent sequences to become cross-synchronized, even, for example, if received by different receivers. Likewise, alternately, such padding may provide other control signal information, such as encryption keys that may be employed in any one of a variety of possible encryptions schemes. Likewise, such padding values may be employed for watermarking or authentication of received binary sequences. Again, these are just a few examples of possible uses of the padding values in connection with a binary sequence as described in this particular embodiment. Alternately, such padding could provide "context control," such as, for example, depending upon the particular context, using padding to provide control signal information designating or indicating the meaning of the data or signal information that is being received. Perhaps, for example, without intending to limit the scope of the claim subject matter, each natural numeral, or at least some of the natural numerals being transmitted, represents data for a different purpose at the receiving end of a communications channel. Likewise, depending on the particular environment, it may be possible to insert real time information in place of padding values as binary sequences are transmitted between different points or nodes, for example. This may be useful, for example, if there are delays or other communication system performance information, for example, that it is desirable to capture in real time in a string of communication transmissions, for example. Likewise, another application may include inserting error correction coding into the binary sequence so as not to disturb the data being transmitted.

In still yet another embodiment, content signal information may be provided by padding values. Examples, without limitation include: audio signal information, video signal information, picture signal information, VoIP encoding signal information, or other information about the content of the sequence.

In yet another embodiment, although, again, the claimed subject matter is not limited in scope in this respect, compression may be applied. For example, if natural numerals are to be transmitted, the particular natural numbers may be factored into non-composite numerals and indices for the non-composite numerals, such as those indicated in FIG. 6, for example, may be represented in the binary sequence, potentially reducing the number of total binary values to be transmitted.

An aspect of this particular embodiment also relates to converting from the binary sequence acquired at the receiver to a sequence of natural numerals. Of course, for this particular embodiment, data or signal information and padding values are separated. Likewise padding values are then ignored at least for the purposes of determining the natural numerals that were transmitted. As previously described, one approach may be to employ a look up table containing information, such as that illustrated in FIG. 5. In an alternate embodiment, however, it may be possible to, instead, determine the associated natural numeral with the received binary sequence through computation. This may be accomplished, for this particular embodiment, in a manner similar to an inverse of the approach depicted in FIG. 4.

Once a grouping of sequence values representing a particular natural numeral, or representing a particular tree (that corresponds to a particular natural numeral) is received, using the approach described above, for example, for this particular embodiment, that grouping is evaluated.

For example, as previously suggested for this particular embodiment, if the grouping is empty, this indicates the natural numeral 0. Here, of course, this refers to receiving one set of corresponding binary values for synchronization, such as a right and left parenthesis. However, if a single right parenthesis and a single corresponding left parenthesis is between the one set of corresponding binary values providing synchronization, here a corresponding right and left parenthesis, for this particular embodiment, this indicates the natural numeral 1. If the grouping contains anything else, in this embodiment, further evaluation is performed on the values between the corresponding right and left parentheses, as described in more detail below.

Figure 8:
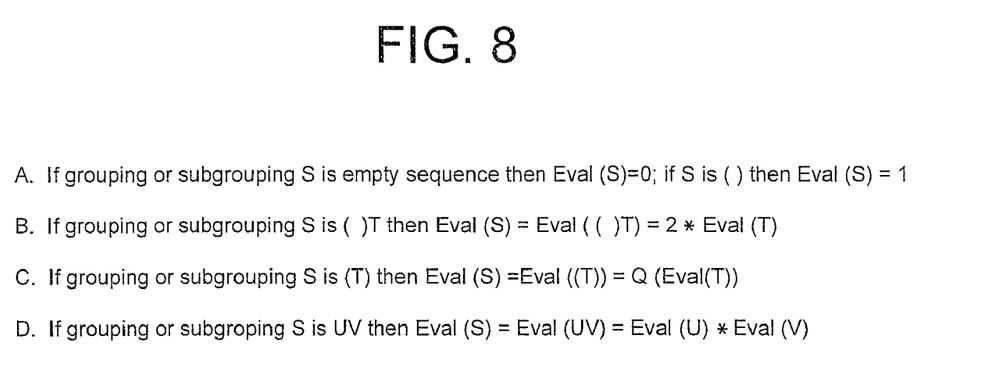
FIG. 8 is a table illustrating an embodiment of a technique for evaluating binary sequences received, such as those received via the approach illustrated in FIG. 7.

Within or between the first set of corresponding right and left parentheses is a subgrouping of values. If the subgrouping is not one of the possibilities discussed immediately above (e.g., empty or a right-left pair, for example), three other possibilities remain for this particular embodiment. First, there may be second set of corresponding right and left parentheses that contain a subgrouping of values. Second, there may be a second set of corresponding right and left parentheses immediately preceding a subgrouping of values. Third, there may be two self-contained or complete subgroupings of binary values side-by-side.

These possibilities are depicted in FIG. 8. In this particular context, the term grouping refers to the longest sequence of consecutive binary values out of a sequence that taken as a whole represents a single natural numeral. The term subgrouping refers to a sequentioal portion of binary values that is a subset of a grouping. It is noted that a grouping may contain subgroupings that represent natural numerals; likewise, a subgrouping may contain smaller subportions that also represent a natural numeral. Thus, in a recursive fashion, the grouping and then the subgroupings are evaluated using the approach illustrated, for this embodiment, in FIG. 8, until a natural numeral is determined for a complete grouping.

Of course, the claimed subject matter is not limited to unordered edge labeled trees. For example, as described in previously cited U.S. provisional patent application 60/543, 371, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing edge labeled trees (ELTs), the previously described embodiments may alternatively be performed using node labeled trees (NLTs). As one example embodiment, operations and/or manipulations may be employed using edge labeled trees and the resulting edge labeled tree may be converted to a node labeled tree. However, in another embodiment, operations and/or manipulations may be performed directly using node labeled trees.

In accordance with the claimed subject matter, therefore, any tree, regardless of whether it is edge labeled, node labeled, non-binary, a feature tree, or otherwise, may be manipulated and/or operated upon in a manner similar to the approach of the previously described embodiments. However, for convenience, without intending to limit the scope of the claimed subject matter in any way, here, operations and/or manipulations and the like have been described primarily in the context of unitary trees. See, for example, U.S. provisional patent application Ser. No. 60/543,371, titled "Manipulating Sets of Hierarchical Data," filed on Feb. 9, 2004, by J. J. LeTourneau, and assigned to the assignee of the current provisional application.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. An article comprising:
   a storage medium having stored thereon instructions that, in response to being executed by a processor, direct said processor to:

initiate transmission of one or more electrical digital signals representative of a sequence of binary values; said sequence of binary values representing a sequence of finite trees comprising signal information in the form of natural numerals, said binary sequence to be formed from said natural numerals according to the following mapping of natural numerals to sequences:

[0]→empty sequence
[1]→( )
[2x]→( ) [x]
[Q(x)]→([x])
[x*y]→[x][y], wherein x and y are natural numerals;

"("and")" are binary values in a sequence;

[x] is a binary sequence formed according to said mapping from x;

Q( ) is a Kleene prime enumeration operation; and

[x][y] is a concatenation of binary sequences formed according to said mapping from x and y, respectively.

2. The article of claim 1, wherein the represented sequence of finite trees comprises a sequence of unitary finite trees.

3. The article of claim 1, wherein the instructions, in response to being executed by said processor, further direct said processor to synchronize said sequence through a count accumulation.

4. The article of claim 1, wherein the instructions, in response to being executed by said processor, further direct said processor to include padding values between two or more representations of a finite tree in said sequence of binary values.

5. The article of claim 4, wherein the instructions, in response to being executed by said processor, further direct said processor to distinguish said padding values in said sequence through a count accumulation.

6. The article of claim 4, wherein the padding values comprise control signal information or content signal information.

7. The article of claim 6, wherein said control signal information comprises at least one of the following:
error correction coding information;
encryption control information;
authentication control information;
watermarking control information; and/or
multiplexing control information, and/or wherein said content signal information comprises at least one of the following:
VoIP encoding signal information;
video signal information;
audio signal information;
picture signal information; and/or
information about the content of said sequence.

8. The article of claim 1, wherein the instructions, in response to being executed by said processor, further direct said processor to distinguish said finite trees by a count accumulation.

9. An apparatus comprising:
a computing platform; said computing platform comprising one or more processors programmed with instructions to initiate transmission of one or more electrical digital signals representative of a sequence of binary values; said sequence of binary values representing a sequence of finite trees comprising signal information in the form of natural numerals, and wherein said binary sequence to be formed said natural numerals according to the following mapping of natural numerals to binary sequences:

[0]→empty sequence
[1]→( )
[2x]→( ) [x]
[Q(x)]→([x])
[x*y]→[x][y], wherein x and y are natural numerals;

"("and")" are binary values in a sequence;

[x] is a binary sequence formed according to said mapping from x;

Q( ) is a Kleene prime enumeration operation; and

[x][y] is a concatenation of binary sequences formed according to said mapping from x and y, respectively.

10. The apparatus of claim 9, wherein said represented sequence of finite trees comprises a sequence of unitary finite trees.

11. The apparatus of claim 9, wherein said one or more processors are further programmed with instructions to synchronize said electrical digital signal representative of said binary sequence through a count accumulation.

12. The apparatus of claim 9, wherein said sequence includes padding values between two or more representations of a finite tree in said sequence.

13. The apparatus of claim 12, wherein said padding values are distinguished in said sequence through a count accumulation.

14. The apparatus of claim 12, wherein said padding values comprise control signal information or content signal information.

15. The apparatus of claim 14, wherein said control signal information comprises at least one of the following:
error correction coding information;
encryption control information;
authentication control information;
watermarking control information; and/or multiplexing control information, and/or wherein said content signal information comprises at least one of the following:
VoIP encoding signal information;
video signal information;
audio signal information;
picture signal information; and/or
information about the content of said sequence.

16. The apparatus of claim 9, wherein said one or more processors are further programmed with instructions to distinguish said finite trees in said sequence by a count accumulation.

17. An apparatus comprising:
a computing platform comprising one or more processors; said computing platform including means for transmitting a sequence of binary values; said sequence of binary values representing a sequence of finite trees comprising signal information in the form of natural numerals, said means for transmitting further comprising means for forming said binary sequenced to be transmitted from said natural numerals.

18. The apparatus of claim 17, wherein said means for transmitting comprises means for transmitting said binary sequence so that the represented sequence of finite trees comprises a sequence of unitary finite trees.

19. The apparatus of claim 17, wherein said means for transmitting comprises means for synchronizing said binary sequence through a count accumulation.

20. The apparatus of claim 17, wherein said sequence includes padding values between two or more representations of a finite tree in said sequence.

21. The apparatus of claim 20, wherein said means for transmitting comprises means for distinguishing said padding values in said sequence through a count accumulation.

22. The apparatus of claim 20, wherein said padding values comprise control signal information or content signal information.

23. The apparatus of claim 22, wherein said control signal information comprises at least one of the following:
   error correction coding information;
   encryption control information;
   authentication control information;
   watermarking control information; and/or multiplexing control information, and/or wherein said content signal information comprises at least one of the following:
   VoIP encoding signal information;
   video signal information;
   audio signal information; picture signal information; and/or information about the content of said sequence.

24. The apparatus of claim 17, wherein said means for transmitting comprises means for distinguishing said finite trees in said sequence by a count accumulation.

* * * * *

UNITED STATES PATENT AND TRADEMARK OFFICE
CERTIFICATE OF CORRECTION

| | | |
|---|---|---|
| PATENT NO. | : 7,630,995 B2 | Page 1 of 1 |
| APPLICATION NO. | : 11/006842 | |
| DATED | : December 8, 2009 | |
| INVENTOR(S) | : Jack J. LeTourneau | |

It is certified that error appears in the above-identified patent and that said Letters Patent is hereby corrected as shown below:

In the Claims

Column 14, line 50, in claim 17, replace "sequenced" with --sequence--.

Signed and Sealed this
Fifteenth Day of September, 2015

Michelle K. Lee
*Director of the United States Patent and Trademark Office*